Nov. 22, 1960 T. G. BERGEY 2,961,154
CENTRIFUGE SYSTEM
Filed Aug. 1, 1955 3 Sheets-Sheet 1
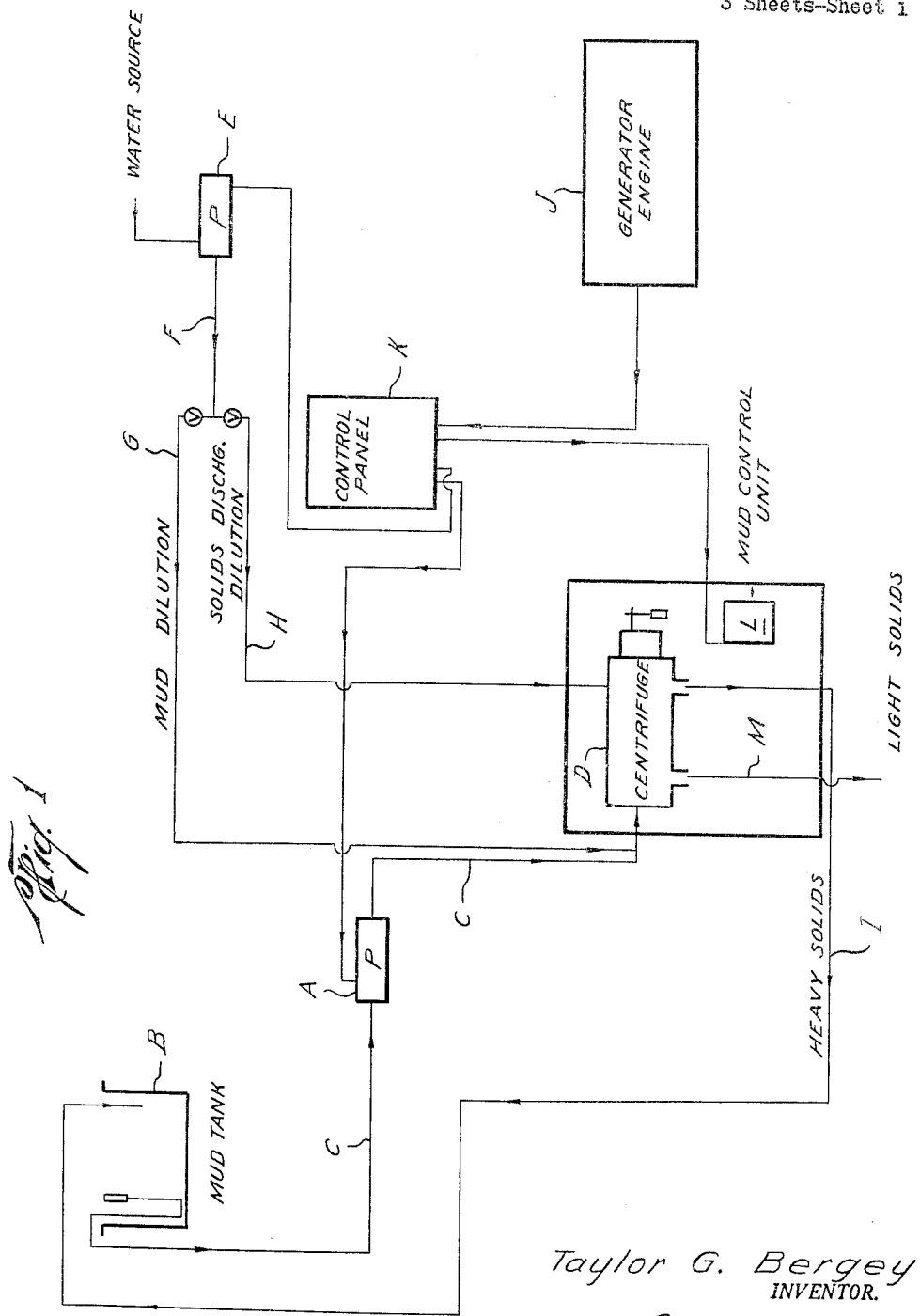
Taylor G. Bergey
INVENTOR.
BY James F. Weiler
Jefferson D. Giller
ATTORNEYS

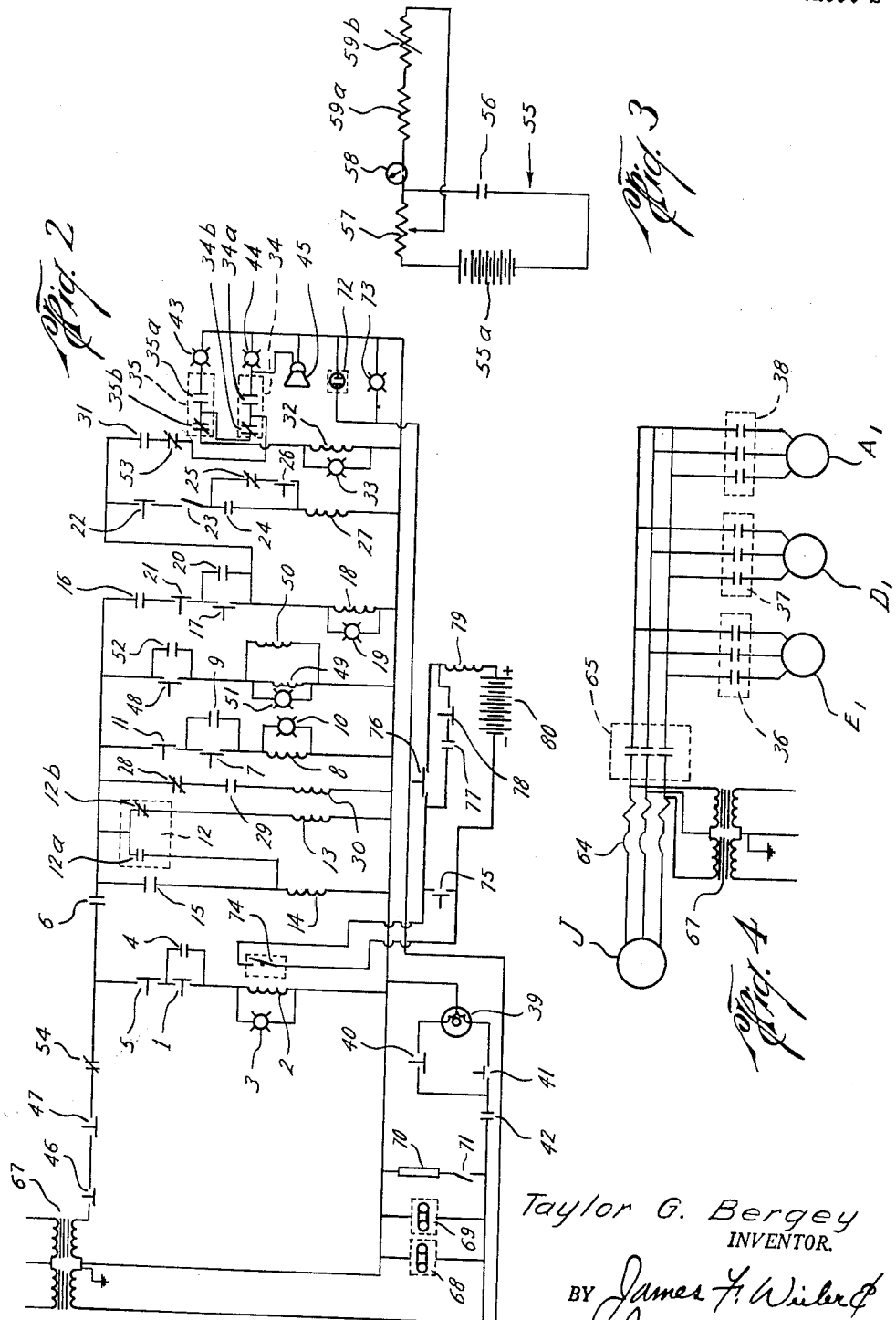

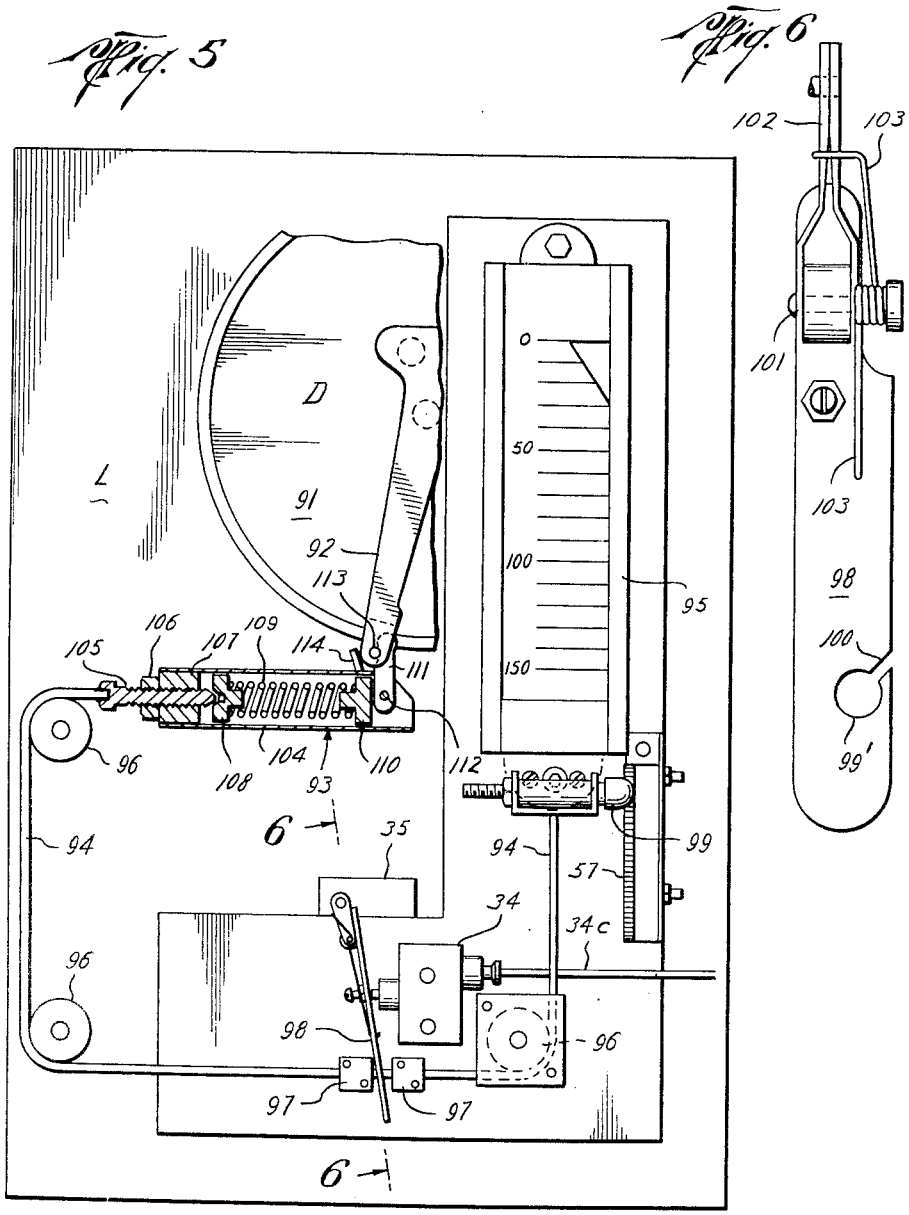

United States Patent Office 2,961,154
Patented Nov. 22, 1960

2,961,154

CENTRIFUGE SYSTEM

Taylor G. Bergey, Houston, Tex., assignor to Houston Oil Field Material Company, Inc., Houston, Tex., a corporation of Delaware Filed Aug. 1, 1955, Ser. No. 525,584

2 Claims. (Cl. 233—19)

The present invention relates to centrifuge devices and, more particularly, relates to a centrifuge system for treating drilling mud while drilling to reclaim heavy solids, such as barites, from discarded muds, to condition muds for completion, assuring a low solids mud opposite the producing formation.

During the early days of rotary drilling of an oil well, no one could have foretold or predicted the importance of good drilling fluid practice to drilling, particularly the deep-lying formations. Drillers were concerned with one property of the drilling fluid, namely, viscosity. It was essential to maintain the drilling fluid in a pumpable condition. This was achieved by water dilution and inasmuch as density of the drilling fluid was of no consequence, this method sufficed.

When an increase in fluid density became necessary, weighting materials, such as barites, were added to the drilling fluid due to their specific gravity. For example, the specific gravity of commercial barites varies from about 4.0 to about 4.4. With an increased fluid density being critical, water dilution could no longer be applied discriminately. To combat high viscosities, a group of viscosity reducing chemicals were developed, such as the tannins and complex phosphates which reduced the fluid viscosity without affecting the fluid density.

As drilling became deeper and formation pressures higher, additional increase in mud density became necessary. For example, in some wells barites must be added to increase the fluid density to as high as eighteen or more pounds per gallon. When the amount of barite is added to obtain these high fluid densities, the available space for drilled solids is decreased and rapid increases of viscosity take place. Under these conditions, chemical treatment for viscosity reduction has a very limited application although water dilution is used to supplement chemical treatment for viscosity reductions. For example, if the viscosity of a sixteen pound per gallon mud is too high and does not react favorably to chemical treatment, approximately 5% to 10% of the mud volume may be discarded and the equivalent volume of water added to the mud circulating system and the required amount of barite added to maintain the needed mud weight, which in this case, would be sufficient barite to maintain sixteen pounds per gallon. This procedure is very costly and the results are not entirely satisfactory.

A few years ago, mud chemists recognized the disadvantages of using a drilling fluid containing a high percentage of drill solids. To combat this, a lime base mud was developed which reduced the particle size of the formation clays and, in effect, reduced the volumetric percentage occupied by the solid or clay particles. Other factors, however, were involved. For example, lime base muds solidified at high bottom hole temperatures and as the high percentage of solids, weight-wise, remained unchanged, rapid rates of bit penetration were not possible.

Mud chemists then recognized two sets of requirements for a good drilling fluid, which are lime base muds and maintenance of a low drilled solids mud (see for example "Composition of Properties of Oil Well Drilling Fluids" by W. F. Rogers, 1948, pages 332–3).

The requirement of a lime base mud is met by using lime, of course, and the maintenance of a low drilled solids mud has been accomplished recently by the use of centrifuges for the mechanical separation of drilled solids from the added barite used to increase the weight or density of the drilling mud.

Extensive work using a decanting type centrifuge has been conducted, see for example "Mechanical Treatment of Weighted Drilling Muds," by Roy A. Bobo and R. S. Hoch, Petroleum Transactions, April 1954, at page 39 where they state that the practicality and economy of using a decanting type centrifuge for mechanical separation of barites and drilled solids have been proven in field operations. Others, for example, Ed McGhee in "Reduced Drilling Costs on Deep Wells, Oil and Gas Journal, October 11, 1954, at page 134 indicate that during the past few years considerable savings have been obtained by the use of muds from which the drilled light clay solids have been removed. These muds have made possible savings up to twenty-five percent (25%) of days and twenty percent (20%) of total bits. He further points out that prior to the introduction of the centrifuge, low solid muds were maintained by water dilution which was often an expensive method.

As previously mentioned, the use of a decanting type centrifuge is satisfactory for the purpose of separating formation solids and weighting materials, such as barite. For example, the drilled solids have a specific gravity of the order of 2.5 to 2.7 and commercial barites have a specific gravity of about 4.0 to about 4.4. Consequently, a sufficient variation in specific gravity exists for separation by centrifuges.

In utilizing a centrifuge for the purpose of separating formation solids from weighting material, water is supplied to the bowl of the centrifuge to dilute the mud for the purpose of supplying sufficient water to accomplish maximum separation of drilled solids and weighting material, such as barites. In practice, water should be supplied to the bowl of the centrifuge before it is started because in stopping the centrifuge it is impossible to remove all of the solids from the bowl, the bowl being horizontal, the solids, which could not be removed because of the normal clearance between the conveyor and the bowl, fall to the bottom of the bowl in its stopped position. Thus, water fed to the bowl before starting the centrifuge tends to overcome whatever unbalance these solids might effect. In addition, it is highly desirable to provide water to the bowl of the centrifuge after the mud pump has been stopped so that a major portion of the solids will be removed from the centrifuge. Also, it would be highly advantageous to provide means for stopping the mud pump when excess heavy solids are in the centrifuge and to include means to release the bowl of the centrifuge so that there is no relative motion between the bowl and the conveyor of the centrifuge when some object clogs the inner conveyor thereby minimizing costly damage in the event a rock, steel bolt or other foreign object has been caught within the centrifuge.

It would also be highly advantageous to provide a centrifuge system in which means are provided for automatically maintaining the density of the material in the conveyor between predetermined limits, for example, by providing means to automatically control the mud pump supplying mud to the centrifuge for the purpose of supplying predetermined volumes of weighting material, such as barites, to the centrifuge. It would still further be advantageous to provide an automatic centrifuge system for separating weighting materials, such as barites, from formation solids which is automatic and in which damage to the centrifuge and the system is prevented or substantially minimized by means of providing the controls to be operated in a predetermined sequence only.

It is therefore a major object of the present invention to provide a centrifuge system including a control element for maintaining the volumes of weighting material, such as barites, flowing through the centrifuge between predetermined limits by controlling the action of the mud pump.

It is yet a further object of the present invention to provide a centrifuge system which includes a control element including means for releasing the bowl of the centrifuge so that there is no relative movement between the bowl and the conveyor of the centrifuge when the volume of the solids becomes above a predetermined maximum or a foreign object is caught in the centrifuge, such as releasable or trigger means actuated by excessive torque of the torque arm on the central shaft of the conveyor. It is also an object to include switch means actuated on release of the trigger means to stop the mud pump.

It is yet a further object of the present invention to provide a centrifuge system for separating weighting materials, such as barites, from formation solids which includes a control system for sequential operation of the various elements of the centrifuge system to thereby minimize and avoid damage to the centrifuge and to insure reliable and maximum efficiency in operation of the centrifuge system.

A still further and more particular object of the present invention is the provision of a centrifuge system which includes torque control means for shutting off and on the mud pump in resonse to torque of the load on the inner conveyor of the centrifuge.

Yet a further object of the present invention is the provision of such a centrifuge system which is efficient and reliable in operation and which is "fool proof" in operation so that it can only be operated in a predetermined manner by the operator.

Other and further objects, features, and advantages will be apparent from the following description of a presently preferred example of the invention, given for the purpose of disclosure, and taken in conjunction with the accompanying drawings, where like character references designate like parts throughout the several views, and where—

Figure 1 is a schematic diagram of a centrifuge system according to the invention, Figure 2 is a circuit diagram for operating the various elements of the centrifuge system, according to the invention, Figure 3 is a circuit diagram of a torque meter for the mud centrifuge unit, Figure 4 is a circuit diagram of the power circuits for the centrifuge system, Figure 5 is an elevational view, partly in section, illustrating a presently preferred torque control assembly for maintaining the torque of the centrifuge between predetermined limits, and Figure 6 is a side elevation of an element of the switch assemblies for actuating the switches controlling the operation of the mud pump.

Referring now to the drawings, and particularly to Figure 1, a centrifuge system is illustrated according to the invention. In general, and in a sequence later described, the mud pump A pumps mud from the mud pit or tank B by means of flow line C to the central part of the centrifuge D. The water pump E pumps water from a suitable source, not shown, in water line F through the valved lines G and H, the former line applying water to the mud flow line C for diluting the mud flowing into the centrifuge and the latter line supplying water to the centrifuge for dilution of the heavy solids discharged and returned by line I to the mud pit B.

Inasmuch as the centrifuge system is generally located in the field, on offshore locations and the like where power is not readily available, a generator and prime mover or engine for the generator is provided, all designated by the reference character J for the purpose of supplying power to the control panel K, from which power is supplied to the mud control unit L as well as to the other elements of the centrifuge system, as illustrated.

The light solids are removed in the discharge line M from the centrifuge and are discharged to waste.

In general, in operating the centrifuge system illustrated in Figure 1, the generator is first started to supply power to the control panel, then the water pump is started to supply water to the centrifuge and the mud line. Thereafter, the centrifuge is started, and, preferably, after a predetermined water pressure to the centrifuge is provided. It is noted that it is highly advantageous that water be provided to the centrifuge before it is started. After a predetermined water pressure to the centrifuge is obtained, the mud pump is started to provide mud to the centrifuge for separation and the mud control unit L controls the volume of weighting material, such as barites, fed to the centrifuge by stopping and starting the mud pump in response to torque of the centrifuge. Also, the mud control unit stops the mud pump in the event the torque of the centrifuge becomes greater than a predetermined maximum, for example when a foreign object is caught or stuck in the centrifuge, and a releasable connection is provided to release the conveyor at that maximum pressure.

The heavy solids having the formation solids separated therefrom are returned to the mud pump in the flow line I and the separated formation solids are discarded to waste in the flow line M.

In closing down the centrifuge system, as will be apparent hereinafter, means are provided so that the mud pump is first stopped and the water pump and centrifuge are permitted to run for a predetermined interval thereafter for flushing out the centrifuge.

Figures 2, 3 and 4 illustrate a preferred electrical system for controlling the operation of the various elements of the centrifuge device, and referring now to Figure 2, which is the control circuit and preferably mounted on a central panel for convenience of operation, there is provided a main contactor circuit including a push button 1, a main contactor operating coil 2 and the pilot light 3 for indicating to the operator that the main circuit is closed to the panel. The main contactor circuit also includes the usual normally open switch 4 which is closed by pushing the push button 1 to close the holding circuit of the main contactor circuit. A normally closed push button 5 is provided as a stop for or to open the main contactor circuit.

The main circuit also includes a normally open switch 6 for closing the control circuit to the panel.

A water pump circuit is provided which includes the starter push button 7, which is accessible to the operator, a water pump operating coil 8, the usual normally opened switch 9 on the water pump starter circuit for closing the holding circuit to the coil 8 of the starter circuit and the pilot light 10 which indicates that the water pump circuit is closed.

The water pump circuit includes the push button 11, which is normally opened, for stopping or opening the water pump circuit.

As mentioned previously it is highly advantageous that water be supplied to the centrifuge D before the centrifuge and mud pump are started, and to insure that the water pump circuit includes a pressure switch 12 which has the normally open contacts 12a and normally closed contacts 12b which are actuated by water pressure, as will be described hereinafter. In general, it might be said, however, that the water pressure switch 12 insures a flow of water to the centrifuge before the circuit to the centrifuge circuit is closed to start the centrifuge.

The water pressure switch circuit includes the operating coils 13 and 14 which are energized and de-energized by the pressure switch contacts 12b and 12a, respectively, the coil 14 serving to close the normally opened contacts 15 thereby closing a holding circuit for the water pump and the normally opened control relay 16 closing the control circuit to the centrifuge starter.

Thus, it is not possible to start the centrifuge until water pressure is flowing into the centrifuge at a predetermined minimum pressure.

What might be termed the centrifuge circuit includes the normally opened push button 17, which is the starter button for the centrifuge starter and is accessible to the operator. The centrifuge circuit also includes the operating coil 18 for the centrifuge starter, the pilot light 19 which indicates that the circuit is closed to the centrifuge starter circuit and the usual normally opened switch 20 which is closed by the push button 17 for closing the holding circuit to the centrifuge starter and the control circuit to the mud pump starter circuit. The centrifuge circuit also includes the normally closed push or stop button 21 for opening the circuit to the centrifuge.

As mentioned previously, the normally opened switch 20 of the centrifuge circuit closes the holding circuit to the mud pump circuit which includes a normally closed push button 22 for opening the mud pump control circuit for stopping the mud pump, a toggle switch 23, which is accessible to the operator, and which is normally closed, for opening the mud pump control circuit, a control relay 24 having normally open contacts for closing the holding circuit of the mud pump circuit, a control relay 25, having normally closed contacts, for the purpose of preventing the operating coil 27 of the control relay from closing when the control relay 13 is energized. A push button or starter button 26 is provided for energizing the operating coil 27 of the control relay for the mud pump starter.

There are provided in the mud pump circuit the control relays 28 and 29, the former being normally closed and the latter being normally opened. The normally closed relay 28 opens the coil circuit on the coil 30 when the coil relay 31, which is normally opened, is energized, the normally opened control relay 31 opening the mud pump control circuit when water pressure falls below a predetermined minimum by actuating of the water pressure switch 12. The control relay 29 which is normally opened, closes the coil circuit of the coil 30 when the operating coil 27 of the mud pump is energized. The coil of the control relay 30 is energized when both the control relays 28 and 29 are closed and, as mentioned previously, the control relay 31, which is normally opened, opens the mud pump control circuit when the water pressure fails.

The reference character 32 designates the operating coil for the mud pump starter and the pilot light 33 indicates that the mud pump starter circuit is closed.

An overload shut-off switch 34, such as a microswitch, is provided in the mud pump circuit, which has the normally closed contacts 34b and the normally opened contacts 34a. As will be apparent later, when these contacts are actuated in response to the centrifuge torque arm, the normally closed contacts 34b open the mud pump starter circuit to shut down the mud pump, and the normally open contacts 34a close the circuit to the pilot light 34 and the parallel alarm 35 to signal the operator that the mud pump has been shut down by overloading. When this occurs, the then open contacts 34b must be manually reset to start the centrifuge, as will be apparent later.

A feed control switch 35, such as a microswitch, is provided to control the mud feed to the centrifuge, and includes the normally open contacts 35a and the normally closed contacts 35b. As will be apparent later, these contacts are actuated as a result of torque of the centrifuge. When the normally closed contacts 35b are opened, this opens the mud pump starter circuit and closes the circuit to the pilot light 43, thereby indicating that the mud pump has been shut down by torque control of the centrifuge. When the normally open contacts 35a are closed, such as actuating the centrifuge torque arm, this closes the circuit to the pilot light 43 thereby indicating that the mud pump starter circuit is opened and that the mud pump has been shut down as a result of the torque control. As will be apparent later, this is a floating type operation and permits the torque to be controlled between predetermined values for controlling the volume of weighting material, such as barites, being fed to the centrifuge to obtain maximum efficiency in operation.

Turning now to Figure 4, the reference numerals 36, 37 and 38 diagrammatically indicate the water pump motor starter, the centrifuge motor starter and the mud pump motor starter for the water pump motor $E_1$, the centrifuge motor $D_1$ and the mud pump motor $A_1$, respectively, these starters being controlled by their corresponding circuits illustrated in Figure 2.

Turning back again to Figure 2, there is provided a mud pump speed control motor 39, which is remote from the mud pump motor $A_1$ and which is controlled by the push buttons 40 and 41, which serve to increase the mud pump speed and to decrease the mud pump speed, respectively. These switches are readily available to the operator and preferably are located on the control panel so that complete control over the centrifuge system is exercised at all times. An auxiliary switch 42 having normally opened contacts is included in the mud pump starter circuit and closes the circuit to the mud pump speed control motor 39 when the mud pump motor starter 38 is energized.

The main circuit for the control panel includes an emergency shut-down switch 46 which opens the control circuit. Also, as a safety feature, a normally closed push button 47 is provided, which is actuated by the door of the panel and which has for its function the opening of the control circuit to the panel when the panel door is open.

A time delay circuit is provided to shut down the water pump after the mud pump has been shut down for the purpose of washing out the centrifuge, and this circuit includes the push button 48, the operating coil 49, an operating coil 50 for the stop button 5, in the main panel circuit, and a pilot light 51 to indicate that the time delay relay and the operating coil for the switch 5 are energized. The time delay relay 48 includes the usual switch 52 having normally opened contacts for closing the holding circuit on the time delay relay operating coil 49 and the operating coil 50 for the shut down switch 5 of the main circuit to the panel.

A normally closed control relay 53 is provided which is actuated by the coil 50 for opening the switch 5, and a normally closed time delay relay 54 is provided which opens the main control panel circuit after a preset elapsed time.

Referring now to Figure 3, a circuit is illustrated for indicating the torque of the centrifuge on the control panel, not shown, which is generally indicated by the reference numeral 55 and which includes the battery 55a and the variable resistor 57 for the purpose of indicating torque by the panel torque meter 58, which indicates the torque load on the centrifuge conveyor, and which also includes the fixed and variable resistors 59a and 59b respectively, used to zero the panel torque meter 58. This circuit also includes the switch 56 for opening the torque meter circuit 55 when the centrifuge starter is de-energized.

As best seen in Figure 4 a circuit breaker 64 is provided in the power circuits from the generator J which serves as an overload protection for the panel and the reference numeral 65 denotes the main contactor for the panel.

In supplying power to the control panel, the transformer 67 is provided, see Figures 2 and 4. In operation it has been found satisfactory to use a 440 volt, 3 phase, 60 cycle at 1200 r.p.m. generator and to reduce the voltage to 110 volts at the secondary of the transformer 67 when the circuit breaker 64 is closed.

For convenience, in operation, a pair of convenience outlets 68 and 69 may be provided and a panel light 70 for lighting the panel, the circuit of which is closed and opened by the toggle switch 71. Also, if desired a convenience outlet 72 may be provided in the control panel and a pilot light 73 may be provided for illuminating the torque scale, which will be described later.

Inasmuch as the centrifuge system is used in the field, off-shore locations and the like, the generator J is provided, as previously mentioned, and an engine control circuit is provided for the generator J which includes a normally closed switch 74, such as a microswitch, which momentarily opens a circuit to the engine control relay 77 when the main contactor switch 1 is de-energized. The engine control circuit also includes a push button type switch 75, which is normally opened and which parallels the switch 74 for the purpose of allowing the operator to prevent the engine control relay 79 from becoming de-energized when the main contactor opens. Also, a push button 76, which is normally closed, actuates the engine control relay 79 for opening the magneto circuit, not shown, of the engine to ground. The push button switch 78 is normally closed and constitutes the stop button for the engine circuit. A battery 80 is provided for starting the engine and supplying 12 volt current to the meter and engine start and stop circuits.

In connection with the particular electrical circuit described, the control relays are all double pole, double throw relays. Also, while the electric circuit has been described with great particularity, it will be obvious that other circuits and arrangements satisfactory for the purpose may be utilized.

Turning now to Figure 5, the mud control unit L is illustrated and this control unit is highly advantageous in that it controls the volume of the weighting material flowing through the centrifuge in response to torque on the conveyor of the centrifuge. Turning now to this figure, the bowl 91 of the centrifuge D is illustrated which includes a torque arm 92 which is connected by a torque or trigger release mechanism, generally designated by the reference numeral 93 to a cable 94, which is ultimately connected to the spring scale 95. A plurality of rollers 96 are provided so that torque from the torque arm 92 is transmitted through the connection 93, cable 94 against the spring of the scale 95 to give a visual measurement of torque that is exerted.

A pair of contact members 97 are provided on the cable 94 to engage and actuate the contact arm 98 which actuates the overload shut-off microswitch 34 and the mud feed control microswitch 35. Thus, as torque is applied against the yielding spring action of the spring scale 95, the cable 94 will be moved thereby moving the contact arm 98 which thereby engages and actuates either the switch 34 or the switch 35, as the case may be. When the torque of the torque arm 92 is reduced, the cable 94 will be moved by the action of the spring of the spring scale 95 thereby moving the contact arm 98 and again closing the circuit to the mud pump to start the flow of mud to the centrifuge. In the event the torque should overcome the predetermined maximum limit, for example when solids are caught in the centrifuge, the releasing connection 93 will release causing the cable 94 to suddenly be released thereby moving the contact arm 98 against the microswitch 34 with sufficient force to actuate the same and thereby opening the circuit to the mud pump thereby stopping the mud pump, as previously described. Also, as mentioned previously a reset arm 34c is provided to manually reset the switch 34 so that the centrifuge may be started again.

A roller contact 99 is connected to the cable 94 which rides upon the resistor 57 for taking off a flow of current that is led through the resistors 59a and 59b, see Figure 3 and to the meter 58 to ground. The meter 58 is scaled to permit the reading of the load indicated on the spring scale directly from the meter on the panel in pounds torque. This advantageously concentrates control and control signals at a central point, such as on the control panel.

Referring to Figure 6 the contact arm 98 has the opening 99' through which the cable 94 extends, and which cable may be inserted into the opening 99' through the slot 100. The arm 98 is pivoted, as at 101 and connected to a second arm 102 which is connected to the microswitch 35. A spring 103 is provided so that sufficient yielding movement of the contact arm 98 is provided for actuating the microswitches 34 and 35.

Turning back again to Figure 5, the torque release connection 93 includes the housing 104 to which the cable 94 is connected by the threaded pin 105, adjusting lock nut 106, and nut 107 secured to the housing 104. The inner end of the threaded pin is connected to the stop member 108 for the compression spring 109 which exerts a force against the stop member 110 which engages the trigger 111 pivoted, as at 112 to the housing 104. The torque arm includes the pin 113 which engages the outer end of the trigger 111 and the fixed contact member 114.

Thus, the force of the spring 109 tends to hold the trigger 111 in the position illustrated until such time as the torque arm 92 overcomes the force of the spring 109 tending to hold it in this position, at which time the trigger 111 will release the pin 113 of the torque arm 92. This also releases the cable 94 to the action of the spring in the spring gauge 95 which causes the contact arm 98 to be moved over sharply to engage the switch 34 for opening the circuit to the mud pump and, also, the roller contact 99 rolls off the resistor 57 thereby giving an indication in the gauge 58 that there is no torque provided on the torque scale.

In operation, the engine $D_1$ of the generator D is started by pressing push button 76 which closes a circuit through the operating coil 79 of the engine control relay which closes the engine control relay 77 thereby locking in the coil circuit. This opens the engine magneto ground circuit, not shown, allowing the engine to be started.

The circuit breaker 64 is normally closed and by pressing push button 1, the circuit to the operating coil 2 of the main contactor 65 is closed, which closes switch 4 locking in the coil circuit. The pilot light 3 indicates that the main contactor is closed and current from the generator J is being supplied through the transformer 67 to the panel. As mentioned previously, it has been found satisfactory to have 440 volts, 3 phase, 60 cycles on the power circuits and to step down the voltage to 110 volts for the control circuits. In addition, the switch 6 closes thereby providing 110 volts to the remainder of the control elements.

Once the generator is supplying power and the main contactor switch 1 is closed, push button 7 is pressed which energizes the operating coil 8 of the water circuit which closes switch 9 thereby locking in the holding coil circuit of the water pump starter 36. The pilot light 10 paralleling the operating coil 8 is energized and indicates that the water pump motor is now on line. This starts a flow of water to the centrifuge.

When the water pressure flowing through the centrifuge reaches a predetermined pressure, for example two pounds, the pressure switch 12 is actuated and the normally closed contacts 12b are opened to break the circuit to the operating coil 13. This also closes the normally opened contacts 12b and energizes the operating coil of the control relay operating coil 14 which closes their relay and the normally open contacts to lock in the holding circuit to the coil 14 which closes the normally open contacts 15 for locking in the holding circuit to the coil 14. This also closes the normally open contacts 16 for closing the control circuit up to the push buttons 17 for the centrifuge starter circuit. Also, the normally closed contacts 25 are operated by the control relay operating coil 13 for closing in the circuit to the operating coil 27 of the control relay for the centrifuge and the control relay 13 and normally closed contacts 28 close in the control relay operating coil 30.

The failure of water supply would return the contacts of the pressure switch 12 to their normal position, however, while the control relay coil 13 is energized and the normally closed contacts 28 would open the control relay operating coil 30 and shut down the mud pump, the centrifuge starter circuit is locked up to the push button 17 through the control relay operating coil 14, as previously described.

As mentioned previously, water should be supplied to the bowl of the centrifuge before it is started because in stopping the centrifuge it is impossible to remove all of the solids from the bowl. The bowl being horizontal, the solids, which could not be removed because of the normal clearance between the conveyor and the bowl, will fall to the bottom of the bowl in stopped position. Water fed to the bowl before starting the centrifuge tends to overcome whatever unbalance the solids might occur.

The water supply to the pressure switch preferably is taken from the downstream side of the control valve, insuring water flow to the bowl. Closing the control valve shuts down the mud pump, acting the same as the failure of the water supply.

It should be noted that the water supplied to the bowl at this time is also used to dilute the mud for the purpose of supplying sufficient water to accomplish a maximum separation of drill solids and weighting material, such as the barites. Water in controlled amounts is also supplied to the solids discharged of the centrifuge to return the weight material to approximately the weight per gallon of the mud feed.

Now that the circuit is locked in up to the push button 17 of the centrifuge circuit, pressing this push button closes the control circuit to the operating coil 18 actuating the centrifuge starter 37. The holding circuit of the coil 18 is locked in by closing the normally opened contacts 20, which also close the control circuit to the mud pump starting circuit. The pilot light 19 paralleling the coil circuit 18 indicates that this circuit is closed to the centrifuge motor through the motor starter 37 and the auxiliary switch 56 also closes a circuit to the torque meter, such as a 12 volt circuit which has been found to be satisfactory.

Thus, it is not possible to start the mud pump until the centrifuge has been placed in action.

The push button 26 of the mud pump circuit may then be pressed to close the circuit to the control relay operating coil 27, which is locked in by closing of the switch 24. Also, this causes the normally opened switch 29 to close thereby locking in the control relay operating coil 30 thereby closing the normally open switch 31 completing the circuit to the mud pump starter 33 operating coil 32 through normally closed switch 34b and normally closed switch 35b. The pilot light 33 paralleling the coil 32 also lights indicating that the circuit to the mud pump motor $E_1$ is closed.

The water pump motor $E_1$, the centrifuge motor $D_1$ and the mud pump motor $A_1$ are now on line and operating. It is noted, however, that it is not possible to start the centrifuge until water is flowing into the centrifuge at a predetermined minimum pressure, and that it is not possible to start the mud pump until the centrifuge has been started. Also, if the water pressure falls below a predetermined minimum, say two pounds, the circuit is opened to the mud pump thereby stopping the mud pump.

The loading of the centrifuge D is directly proportional to the amount of heavy solids in the mud being fed to the centrifuge. For example, barites, having a specific gravity of approximately 4.2, when acted upon by the centrifugal force created by the rotation of the bowl of the centrifuge, are compacted to the point that the centrifuge conveyor has to do considerable work to transport them from the machine. This is translated into torque on the pinion of the conveyor drive gear box, not shown, and through it to the torque arm 92 which is fastened to the pinion. It is noted that the torque arm and its arrangement with the centrifuge is part of a conventional centrifuge, such as a Sharples PN–14 (Conical) Super-D-Canter centrifuge, and, accordingly no detailed description of this arrangement is deemed necessary.

The volume of drill mud being fed to the centrifuge D determines the amount of barites that the conveyor has to remove within any given time and therefore to control the torque load, the feed to the centrifuge D must be controlled. This is accomplished through driving the mud pump through a variable speed drive, such as a positive displacement mud pump with a variable speed drive, and by regulating the setting of the drive by a reversible motor 39 which is actuated to increase the pump by the push button 40 and to decrease the pump speed by the push button 41.

Preferably, a narrow range of torque loading is provided to permit the machine to run continuously without overloading, and for this purpose a floating feed control through switch 35 is provided. Thus, by opening the normally closed switch 35b, the mud pump is stopped by breaking the circuit to the mud pump starter coil 32, and at the same time the normally opened contacts 35a close which lights the pilot light 43 indicating that the mud pump circuit is open because of torque. The drop in torque because of the stopping of the mud feed reverses this operation and starts up the mud pump. This is done by the movement of the contact arm 98 actuating the microswitch 35 by movement of the cable 94 against the force of the spring in the spring scale 95. When the desired torque has been obtained and the switch 35 reversed, the pilot lights 33 and 43 indicate that this has occurred.

As mentioned previously, the roller contact 99 rides on the resistor 57 to give a direct reading in torque on the torque meter 58 mounted on the panel.

In the event the torque on the torque arm 92 becomes more than a predetermined maximum, say 50 or 60 pounds, the torque arm release 93 releases the torque arm and this sudden release causes the cable 94 to move the contact arm 98 over with sufficient force to actuate the overload switch 34 which opens the normally closed contacts 34b and coil circuit 32, thereby shutting down the mud pump. The torque arm will now be rotating with the bowl and there will be no relative motion between the centrifuge bowl and the centrifuge conveyor. This prevents damage to the centrifuge as mentioned previously. Before further operations again take place, the torque arm 92 will have to be reconnected to the torque arm release connection 93 and the switch 34 reset by the switch member 34c. Before this can be accomplished, however, the reason for the excessive torque and the excessive loading within the bowl will have to be overcome or removed before the centrifuge can be brought up to speed and placed on string. During this time, the normally open contacts 34b will close thereby closing the circuit through the pilot light 44 indicating that the mud pump A is shut down because of abnormal torque overload.

When it is desired to shut down the centrifuge system, the shut-down push button 48 may be pressed which actuates the time delay relay by closing its operating coil circuit 49. This closes the normally open contacts 52 of the time delay relay and locks in the coil circuit for a predetermined period of time. This also energizes the control relay operating coil 50 which opens the normally closed contacts 53 thereby opening the mud pump control circuit and stopping the mud pump. The centrifuge and the water pump continue to operate until the end of the preset time. This permits the bowl to be emptied of all barites or other solids that can be removed by the conveyor of the centrifuge D.

The time delay relay through the normally closed contact 54 momentarily breaks the control circuit to the main contactor operating coil 2 when the preset time has elapsed which opens the circuit to the centrifuge motor $D_1$ and water pump motor $E_1$ thereby shutting them down.

The main contactor may then be opened, which momentarily breaks the coil circuit 79 which shuts the engine down. This can also be accomplished by pressing the push button 78.

It has been found satisfactory in use to have the centrifuge speed up to about 1800 r.p.m. before providing mud to the centrifuge. In this connection, it has been found that about 1600 to about 2200 r.p.m. for the centrifuge is satisfactory for most drilling muds. Also, for a mud pump pumping two gallons of mud per minute for each 100 r.p.m., mud pump speeds which are satisfactory are about 1000 r.p.m. for mud weights up to about twelve pounds per gallon, from about 800 to 1000 r.p.m. for mud weights of about twelve to about fourteen pounds per gallon, 400 to 800 r.p.m. for mud weights of from about fourteen to about sixteen pounds per gallon, and for mud weights above sixteen pounds per gallon, mud pump speeds of from about 300 to 400 r.p.m.

Any desired centrifuge may be used, but a Sharples PN-14 (Conical) Super-D-Canter centrifuge has proven satisfactory in use. Any desired generator unit may be used, however, 440 volt, 3 phase, 60 cycle generator is satisfactory.

While any desired torque range may be provided for the mud control element and switch 35 may be operated at an upper torque load of about thirty or thirty-five pounds and at a lower torque load of about fifteen pounds, although other ranges may be used.

It is deemed unnecessary to describe in detail the various electrical elements as they are conventional, form no part of the invention as such, and may readily be obtained on the commercial market.

While the particular circuit for the centrifuge system and parts have been described specifically, as well as operating conditions, these are given for the purpose of disclosure and, obviously, the operating conditions may be varied to meet varying conditions and desired results; also, various electrical circuits may be used and rearrangement of parts and changes in details made within the spirit of the invention.

It should be noted that in unweighted muds where it is essential to maintain low-weight drilling mud, the centrifuge system is operated as described except that the bowl speed is increased, say to the order of 3200 r.p.m. so that all solids are discarded and water from the mud is returned to the circulating system. Such muds are predominant in west Texas.

The centrifuge system of the present invention is therefore well suited to carry out the objects and attain the advantages and ends mentioned, as well as others inherent therein, and, accordingly, the invention is to be limited only by its spirit and the scope of the appended claims.

What is claimed is:

1. A torque control for a centrifuge comprising, a torque arm responsive to torque of the centrifuge, a cable adapted for yielding movement, a releasable overload coupling connecting the cable to the torque arm and arrangd to release the cable for movement in one direction at a predetermined maximum torque, stop means on the cable, a first switch means including an element engageable by the stop means on movement of said cable in the other direction, second switch means engageable by said element on movement of the cable in the one direction, electric feed supply control means arranged to control feed to the centrifuge, and electric means connecting the first switch means and second switch means to the electric feed control supply means so that said movement of said cable in said other direction actuates said first switch means and said movement of the cable in said one direction actuates said second switch means thereby actuating said electric feed control supply means.

2. A torque control for a centrifuge comprising, a torque arm responsive to torque of the centrifuge, a cable, a spring connected to one end of the cable, means responsive to movement of the cable indicating torque of the torque arm, a releasable overload coupling connecting the other end of the cable to the torque arm and arranged to release the torque arm at a predetermined maximum torque, an electric circuit including a first switch provided with an engageable element for actuation thereof, stop means on the cable arranged to engage the switch on movement of the cable in one direction, electric feed control means controlling feed to the centrifuge, said electric circuit electrically connecting the first switch to the electric feed control means, said first switch and said electric feed supply means arranged so that actuation of said first switch in one direction shuts off the feed to the centrifuge and in the other direction supplies the feed thereto, release of said coupling releasing the cable for movement in the other direction, and a second switch in the electric circuit provided with a contact engageable by said element on said movement of the cable in the other direction, said second switch electrically connected by said electric circuit to said electric feed control means and arranged so that actuation of said second switch also shuts off the feed to the centrifuge.

References Cited in the file of this patent

UNITED STATES PATENTS

| | | |
|---|---|---|
| 1,091,449 | Westin | Mar. 24, 1914 |
| 1,171,632 | Nuesell | Feb. 15, 1916 |
| 1,182,347 | Carlson | May 9, 1916 |
| 1,401,740 | Schaf | Dec. 27, 1921 |
| 1,490,899 | Scott | Apr. 15, 1924 |
| 1,507,413 | Bryson | Sept. 2, 1924 |
| 1,529,199 | McNelly | Mar. 10, 1925 |
| 1,921,296 | Harkness | Aug. 8, 1933 |
| 2,052,481 | Miller | Aug. 25, 1936 |
| 2,112,371 | Korvec | Mar. 29, 1938 |
| 2,186,704 | Little | Jan. 9, 1940 |
| 2,210,759 | Hansen | Aug. 6, 1940 |
| 2,461,764 | Olcutt | Feb. 15, 1949 |
| 2,466,988 | Hertrich | Apr. 12, 1949 |
| 2,682,488 | Kochli | June 29, 1954 |

FOREIGN PATENTS

| | | |
|---|---|---|
| 428,188 | Great Britain | May 8, 1935 |

OTHER REFERENCES

McGee: "Reduced Drilling Costs on Deep Wells," The Oil and Gas Journal, vol. 53, October 1954, pages 134–136.